United States Patent [19]

Jackson et al.

[11] Patent Number: 5,906,896
[45] Date of Patent: May 25, 1999

[54] ROTARY SEAL MEMBER COATED WITH A CHROMIUM CARBIDE-AGE HARDENABLE NICKEL BASE ALLOY

[75] Inventors: John Eric Jackson, Brownsburg; Marianne O'Connor Price, Indianapolis, both of Ind.

[73] Assignee: Praxair S.T. Technology, Inc., Danbury, Conn.

[21] Appl. No.: 07/917,670

[22] Filed: Jul. 21, 1992

Related U.S. Application Data

[63] Continuation of application No. 07/729,154, Jul. 12, 1991, abandoned.

[51] Int. Cl.$^6$ ........................................ F16J 15/00
[52] U.S. Cl. ..................... 428/621; 428/614; 428/679; 428/680; 428/937; 428/469; 428/472; 428/498; 415/170.1; 415/216.1
[58] Field of Search .......................... 277/96.2; 428/680, 428/937, 621, 469, 472, 698, 679, 614; 415/170.1, 200, 216.1

[56] References Cited

U.S. PATENT DOCUMENTS

| | | | |
|---|---|---|---|
| 3,150,938 | 9/1964 | Pelton et al. | 427/423 |
| 4,259,090 | 3/1981 | Bovenkerk | 51/309 |
| 4,275,124 | 6/1981 | McComas et al. | 428/769 |
| 4,457,491 | 7/1984 | Dudman | 277/234 |
| 4,566,700 | 1/1986 | Shiembob | 277/96.1 |
| 4,659,448 | 4/1987 | Gordon | 204/277 |
| 4,666,733 | 5/1987 | Wlodek | 420/36 |
| 4,693,942 | 9/1987 | Shimizu et al. | 428/614 |
| 4,697,633 | 10/1987 | Darragh et al. | 165/51 |
| 4,851,093 | 7/1989 | Routsis | 204/146 |
| 4,884,820 | 12/1989 | Jackson et al. | 415/173.5 |
| 5,042,824 | 8/1991 | Gardner et al. | 277/96 |
| 5,141,821 | 8/1992 | Lugscheider et al. | 428/614 |

OTHER PUBLICATIONS

"Metals Handbook", Ninth Edition, vol. 4, TA 472 A3 C.2, 1981, pp. 758–759.

"Refractory metal carbide coatings for LMFBR applications—A systems approach", reprinted from Journal of Vacuum Science and Technology, vol. 12, No. 4, Jul./Aug. 1975, pp. 777–783, T.A. Wolfla and R.N. Johnson.

"Development of Several New Nickel Aluminide and Chromium Carbide Coatings for Use in High Temperature Nuclear Reactors". T.A. Taylor et al, International Conference on Metallurgical Coatings, Apr. 18–22, 1983.

"Plasma and Detonation Gun Applied Coatings—Design Alternatives to Reduce Friction and Wear", T.A. Wolfla et al, International Conference on Liquid Metal Technology in Energy Production, May 3–6, 1976.

"Sodium Compatibility Studies of Low Friction Carbide Coatings for Reactor Application", G.A. Whitlow et al, Westinghouse Electric Corporation, Madison, PA.., International Corrosion Forum Mar. 4–8, 1974, paper No. 17, pp.1–9.

*Primary Examiner*—Ngoc-Yen Nguyen
*Attorney, Agent, or Firm*—Robert J. Feltovic

[57] ABSTRACT

A gas seal for rotary shaft applications in which at least a portion of a contact surface of one member of the seal that has relative motion with and in contact with a second member of the seal is coated with a chromium carbide-age hardenable nickel base alloy. The process for depositing and heating the coating is also claimed.

4 Claims, 1 Drawing Sheet

ROTARY SEAL MEMBER COATED WITH A CHROMIUM CARBIDE-AGE HARDENABLE NICKEL BASE ALLOY

This application is a Continuation of prior U.S. application: Ser. No. 729,154 filed Jul. 12, 1991, now abandoned.

FIELD OF THE INVENTION

The invention relates to fluid seals for rotary shaft applications in which at least a portion of a contact surface is coated with a chromium carbide-age hardenable nickel base alloy.

BACKGROUND OF THE INVENTION

Rotary contact seals are seals in which the rotating and stationary seal faces are kept in nominal contact. The seals have minimum fluid leakage but are limited in speed capability by frictional heat generation and wear problems at the interface between the faces. Rotary contact seals can be either circumferential seals, with a circumferential contact area between the internal diameter of a sealing ring and the shaft surface, or face seals with contact between the radial seal faces.

Generally, the basic face contact seal consists of two solid rings of material held in nominal contact along a radial face by an axial load. Usually one of its rings is a soft material such as a carbonaceous material, i.e., carbon and the other would be a hard material such as a metal or metal alloy; i.e., steel, tungsten carbide or silicon carbide. Which ring rotates and which is held stationary depends on the individual seal design and application, although it is more common for the hard ring to rotate. The rotating ring is usually mounted in a fixed position on a shaft, with the stator ring loaded so as to press axially against it. The axial load can be provided by springs, bellows, magnetic means or the like. Although contact seals have negligible leakage characteristics, they are subject to wear problems due to the frictional contact of the surfaces.

Copending U.S. patent application Ser. No. 07/599,482 filed Oct. 10, 1990 now U.S. Pat. No. 5,137,422, discloses an erosion resistant coating for turbo machine gas path components which comprises the thermal spray depositing of a chromium carbide and an age hardenable nickel base alloy onto the surface of the gas path components and then preferably heat treating the gas path component. This reference is incorporated herein as if it were recited in its entirety.

The chromium carbide base thermal spray coating family has been in use for many years to provide sliding and impact wear resistance at elevated temperatures. The most frequently used system by far is the chromium carbide plus nickel chromium composite. The nickel chromium (usually Ni –20 Cr) constituent of the coating has ranged from about 10 to about 35 weight percent. These coatings have been produced using all types of thermal spray processes including plasma spray deposition as well as detonation gun deposition. The powder used for thermal spray deposition is usually a simple mechanical blend of the two components. While the chromium carbide component of the powder is usually $Cr_3C_2$, the as-deposited coatings typically contain a preponderance of $Cr_7C_3$ along with lesser amounts of $Cr_3C_2$ and $Cr_{23}C_6$. The difference between the powder composition and the as-deposited coating is due to the oxidation of the $Cr_3C_2$ with consequent loss of carbon. Oxidation may occur in detonation gun deposition as a result of oxygen or carbon dioxide in the detonation gases, while oxidation in plasma spraying occurs as a result of inspiration of air into the plasma stream. Those coatings with a relatively high volume fraction of the metallic component have been used for self-mating wear resistance in gas turbine components at elevated temperatures. These coatings, because of the high metallic content, have good impact as well as fretting wear and oxidation resistance. At lower temperatures, coatings with nominally 20 weight percent nickel-chromium have been used for wear against carbon and carbon graphite in mechanical seals, and for wear in general in adhesive and abrasive applications. These coatings are most frequently produced by thermal spraying. In this family of coating processes, the coating material, usually in the form of powder, is heated to near its melting point, accelerated to a high velocity, and impinged upon the surface to be coated. The particles strike the surface and flow laterally to form thin lenticular particles, frequently called splats, which randomly interleaf and overlap to form the coating. The family of thermal spray coatings includes detonation gun deposition, oxy-fuel flame spraying, high velocity oxy-fuel deposition, and plasma spray.

It is an object of the present invention to provide a coating having excellent contact wear resistance for a contact surface of a face contact fluid seal.

It is another object of the present invention to provide a face contact fluid seal in which one of the contacting surfaces is coated with a chromium carbide-age hardenable nickel base alloy coating that has excellent contact wear characteristics.

It is another object of the present invention to provide a method for coating a contact surface of a face contact fluid seal with a chromium carbide-age hardenable nickel base alloy coating.

The foregoing and additional objects will become more apparent from the description and disclosure hereinafter set forth.

SUMMARY OF THE INVENTION

The invention relates to a face contact fluid seal comprising a first member cooperating with and in contact with a second member with at least one of said members moving on the surface of the other member; the improvement wherein at least a portion of the surface of the one member in contact with the other member is coated with a chromium carbide-age hardenable nickel base alloy coating. The invention also relates to a process for coating the contact surface of a face contact fluid seal with a chromium carbide-age hardenable nickel base alloy. Preferably the surface of the first member would be steel and the surface of the second member would be carbon.

Preferably, the as-deposited coated layer on the contact surface of the seal would be heated at an elevated temperature and for a time period sufficient to cause precipitation of intermetallic compounds within the nickel base alloy constituent of the coated layer. In the heat treatment step, there is a transformation of the highly stressed microcystalline as-deposited structure to a more ordered structure in which the phases exhibit well defined X-ray diffraction patterns.

As used herein, an age hardenable nickel base alloy shall mean a nickel base alloy that can be hardened by heating to cause a precipitation of an intermetallic compound from a supersaturated solution of the nickel base alloy. The intermetallic compound usually contains at least one element from the group consisting of aluminum, titanium, niobium and tantalum. Preferably the element should be present in an amount from 0.5 to 13 weight percent, more preferably from 1 to 9 weight percent of the coating. The preferred age hardenable nickel base alloy is Inconel 718 which contains about 53 weight percent nickel, about 19 weight percent iron, about 19 weight percent chromium, with the remainder being about 3 weight percent molybdenum, about 5 weight percent niobium with about 1 weight percent tantalum and minor amounts of other elements. Inconel 718 when heated can be strengthened by nickel intermetallic compounds precipitating in an austenitic (fcc) matrix. Inconel 718 is believed to deposit a nickel-niobium compound as the hardening phase. For age hardening alloys precipitation starts at about 1000° F. and generally increases with increasing temperature. However, above a certain temperature, such as 1650° F., the secondary phase may go back into solution. The resolutioning temperature for Inconel 718 is 1550° F. (843° C.). Typical aging temperatures for Inconel 718 are from 1275° F. to 1400° F. (691° C.–760° C.) with the generally preferred temperature being 1325° F. (718° C.). Generally for a nickel base alloy the age hardening temperature would be from 1000° F. to 1650° F. and preferably from 1275° F. to 1400° F. The time period of the heating treatment could generally be from at least 0.5 hour to 22 hours, preferably from 4 to 16 hours.

Suitable chromium carbides are $Cr_3C_2$, $Cr_{23}C_6$, $Cr_7C_3$, with $Cr_3C_2$ being the preferred. Deposited coatings of $Cr_3C_2$ plus Inconel 718 have been examined by X-ray evaluation of the microstructure and found to consist predominantly or substantially of $Cr_7C_3$ plus $Cr_{23}C_6$. It is believed that on long term exposure at elevated temperatures, the $Cr_7C_3$ may be converted to $Cr_{23}C_6$. For most applications, the chromium in the chromium carbide should be from 85 to 95 weight percent, and preferably about 87 weight percent.

For most applications, the weight percent of the chromium carbide component of the coating could vary from 50 to 95 weight percent, preferably from 70 to 90 weight percent and the age hardenable nickel base alloy could vary from 5 to 50 weight percent, preferably from 10 to 30 weight percent of the coating.

Flame plating by means of detonation using a detonating gun can be used to produce coatings of this invention. Basically, the detonation gun consists of a fluid-cooled barrel having a small inner diameter of about one inch. Generally a mixture of oxygen and acetylene is fed into the gun along with a coating powder. The oxygen-acetylene fuel gas mixture is ignited to produce a detonation wave which travels down the barrel of the gun whereupon the coating material is heated and propelled out of the gun onto an article to be coated. U.S. Pat. No. 2,714,563 discloses a method and apparatus which utilizes detonation waves for flame coating. The disclosure of this U.S. Pat. No. 2,714,563 is incorporated herein by reference as if the disclosure was recited in full text in this specification.

In some applications it may be desirable to dilute the oxygen-acetylene fuel mixture with an inert gas such as nitrogen or argon. The gaseous diluent has been found to reduce the flame temperature since it does not participate in the detonation reaction. U.S. Pat. No. 2,972,550 discloses the process of diluting the oxygen-acetylene fuel mixture to enable the detonation-plating process to be used with an increased number of coating compositions and also for new and more widely useful applications based on the coating obtainable. The disclosure of this U.S. Pat. No. 2,972,550 is incorporated herein by reference as if the disclosure was recited in full text in this specification.

In other applications, a second combustible gas may be used along with acetylene, such gas preferably being propylene. The use of two combustible gases is disclosed in U.S. Pat. No. 4,902,539 which is incorporated herein by reference as if the disclosure was recited in full text in this specification.

Plasma coating torches are another means for producing coatings of various compositions on suitable substrates according to this invention. The plasma coating technique is a line-of-sight process in which the coating powder is heated to near or above its melting point and accelerated by a plasma gas stream against a substrate to be coated. On impact the accelerated powder forms a coating consisting of many layers of overlapping thin lenticular particles or splats.

Another method of producing the coatings of this invention may be the high velocity oxy-fuel, including the so-called hypersonic flame spray coating processes. In these processes, oxygen and a fuel gas are continuously combusted thereby forming a high velocity gas stream into which powdered material of the coating composition is injected. The powder particles are heated to near their melting point, accelerated, and impinged upon the surface to be coated. Upon impact the powder particles flow outward forming overlapping thin, lenticular particles or splats.

The chromium carbide powders of the coating material for use in obtaining the coated layer of this invention are preferably powders made by the carbonization of chromium and then crushing the resultant product. In this process chromium and carbon are reaction sintered at a high temperature and the resultant sinter product is crushed and sized. The metallic powders are preferably produced by argon atomization followed by sizing. The powder components are then blended by mechanical mixing. The powder blend is normally used as the feed material in conventional thermal spray processes. However, agglomerated sintered powder can be used in which each agglomerated powder particle contains both the chrome carbide and metallic constituent.

Conventional type coatings of 20[80Ni20Cr]+80 [Cr. Carbide] (hereinafter referred to as LC1) has een used on annular face seals mating against carbon for many years. These seals can operate at high surface speeds and relatively low unit loading, sealing oil from air at high operating temperatures. It is not unusual to find radial cracks in the contact zone of coated seals that have been operated at high temperatures. Such cracks are believed to be the result of local "hot spots" and can marginally increase the leakage rate across the seal but are generally tolerable. However, sometimes blisters can form in the contact zone, leading to an unacceptably high leakage rate. Analysis of these blistered seals suggested that radial cracking could be a precursor to blistering because it allows air penetration and oxidation of the substrate interface, weakening the coating bond in the vicinity of the crack.

It is believed that if the resistance to cracking caused by the "hot spots" can be improved, then the resistance to blistering and consequent leakage would be improved. A relatively inexpensive test was devised to model the stress sequence occurring at a localized contact spot on a seal. In the test the early compressive stress and elevated temperature of a "hot spot" is simulated by bending a coated bar with the coated side in compression and heating the bar while loaded. The cooling of the hot spot is then simulated by cooling the bar in the compressive state. After the bar is cooled it is unloaded and allowed to return to a flat condition. Depending on how much the coating yielded at the test load and temperature, the coating may crack before the bar returns to a flat condition. This can be considered comparable to the radial cracking which occurs during cooling of a "hot spot". Age hardened Inconel 718 was chosen as the substrate material for the test so that little to no yielding of the substrate itself would occur so that all changes would be due to coating characteristic changes.

The temperature experienced at a hot spot is not precisely known. Therefore preliminary experiments were done with LC1 coatings at various compressive loads and temperatures. The compressive loads and temperatures were matched as follows. It was assumed that the seal runs at an average temperature of 300° F. and that the coating coefficient of thermal expansion (CTE) is $5.6 \times 10^{-6}$/deg. F. For a maximum assumed hot spot temperature, T, the associated maximum compressive strain was simplistically estimated as: CTE(coating)×(T—300° F.).

In the preliminary testing it was found that heating to 1100° F. with a corresponding compressive preload of 0.44% strain was sufficient to cause the LC1 coating to crack just before it returned to a flat condition during the unloading portion of the test. Therefore that preload and temperature were standardized for the rest of the coatings tested.

DRAWINGS

TEST PROCEDURE

Figure 1:
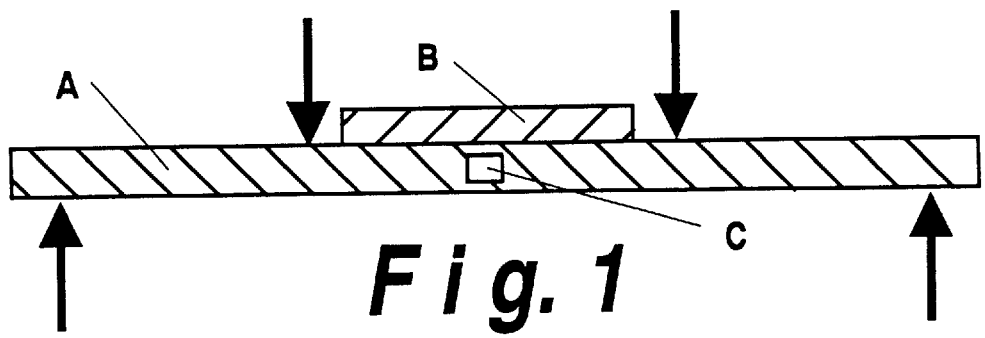
FIG. 1 is a schematic of a four point bending test for bending a bar coated on the top with a layer of a chromium carbide-age hardenable nickel base alloy in which the bar is shown in the flat position.

1. A ¼×½×10 inch long Inconel 718 bar A was coated on one side at the center with a layer of chromium carbide-age hardenable nickel base alloy B for 2 ¼ inches as shown in FIG. 1.

2. A type K chromel-alumel thermocouple C was welded to the edge side (¼ inch side) of the bar as shown in FIG. 1.

3. The bar was bent using a universal testing machine equipped with a four point bending fixture as schematically shown in FIG. 1. The central load points are 2.75 inches apart, while the outer load points are 8 inches apart. Thus the coated area A was located in the constant strain region (uniform curvature) between the central load points.

Figure 2:
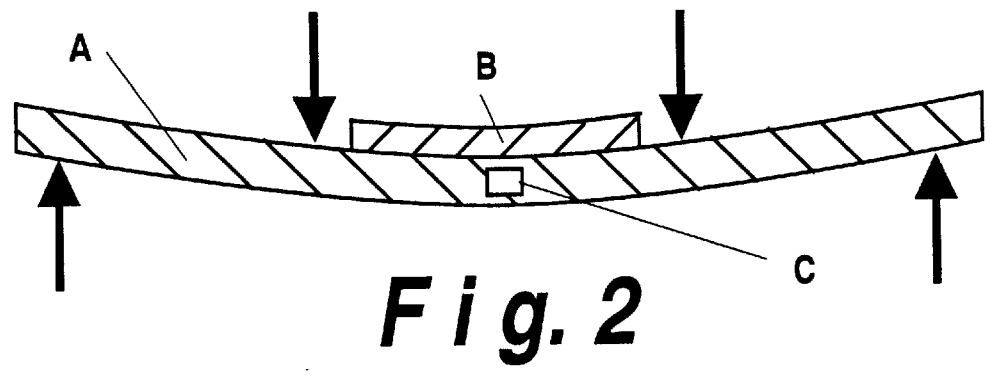
FIG. 2 is a schematic of the four point bending test of FIG. 1 after a force has been applied to bend the bar.

4. The position of the load points was zeroed at the location where they just made contact with the flat bar A. Load was then applied to move the center points downward at a rate of 0.2 inch/minute until they reached a point 0.230 inch from their starting point and the load was maintained as shown in FIG. 2. This 0.230 inch displacement corresponds to a maximum surface strain across the center of the bar of 0.44% which was the standardized preload selected as discussed above. Displacement is related to maximum surface strain by the following relationship:

$$\epsilon = \frac{24\left(\frac{d+t}{2}\right)\delta}{3l^2 - 4a^2}$$

$\epsilon$=maximum surface strain
d=bar thickness
t=coating thickness
$\delta$=displacement of the central load points from their starting position with the bar A flat
l—distance between outer load points
a=distance between inner load points 5. The coated bar with the applied load as shown in FIG. 2 was placed into a furnace, preferably preheated to 1200° F. The bar temperature was continuously monitored using the thermocouple C. The coated bar was removed from the furnace when the bar reached 1100° F. This usually took about 15 to 30 minutes. With the load still applied, the coated bar was cooled to about 20° C. and then a piezoelectric transducer was coupled to the coating and attached to a recorder in order to detect possible cracking as the bar was unloaded. When and if the coating cracked, a sudden burst of energy was released which produced a stress wave which was detected by the transducer.

6. With the recorder on to monitor acoustic emission, the load was released at a controlled rate of 0.2 inch/minute until the coated bar returned to a flat condition.

Figure 3:
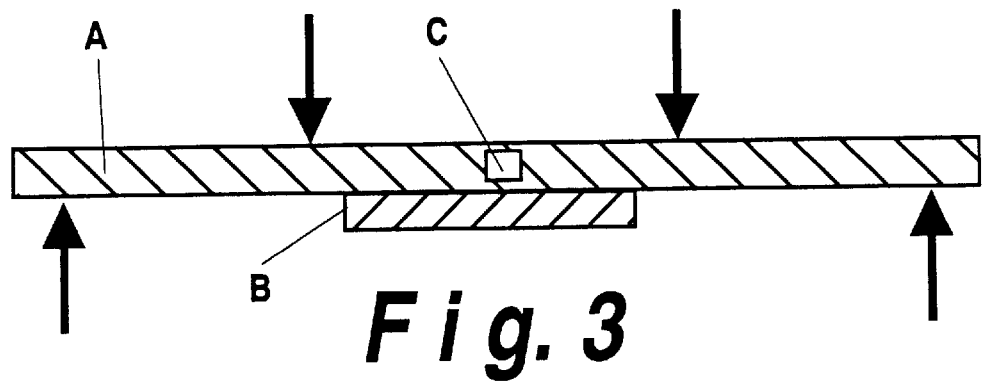
FIG. 3 is a schematic of a four point bending test for bending the bar of FIG. 1 after the bar has been inverted and in which the bar is shown in the flat position.
Figure 4:
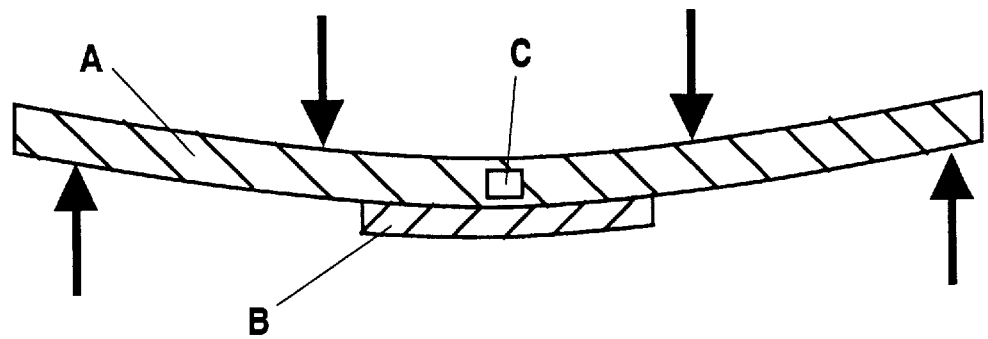
FIG. 4 is a schematic of the four point bending test of FIG. 3 after a force has been applied to bend the bar.

7. If no cracking is detected while unloading the bar, then the bar is turned over as shown in FIG. 3. The bar is then bent as shown in FIG. 4 placing the coating B in tension and the bending is continued to the point where acoustic emission indicates cracking.

EXAMPLE

Two sample coatings were applied to test bars as shown in the Table using a detonation gun process in which the combustion gas mixture contained acetylene and propylene.

In this test, chromium carbide-nickel chromium coating (Sample Coating A) was compared with a coating (Sample Coating B) of this invention, chromium carbide-Inconel 718, in both the as-coated and in the heat treated condition. Coatings about 250 micrometers thick were deposited on an Inconel 718 bar substrate using a detonation gun process. The starting coating powder for Coating B in the Table was 11% Inconel 718 and 89% chromium carbide.

The starting powder for Coating A in the Table was 11 Ni20Cr and 89 chromium carbide.

As shown in the Table, heat treatment significantly improves the yield strength of the Cr carbide coatings and consequently should make them more resistant to thermal stress cracking on annular face seals. Coating B (coating of this invention) exhibits greater response to the heat treatment than did Coating A.

TABLE

Percent Tensile Strain to Produce Coating Cracking Following Compressive Loading at Elevated Temperature

| Coating Sample | Composition | As-Deposited | HT 1000° F./ 20 hr/vac | HT 1325° F./ 8 hr/vac |
|---|---|---|---|---|
| A | 20[80Ni20Cr] + 80 [Cr. Carbide] | 0* | 0* | 0.33% |
| B | 20 [IN 718] + 80 [Cr. Carbide] | 0* | 0.27% | 0.44% |

*Coating cracked during removal of the compressive load and prior to application of any tensile load.

While the example above uses detonation gun means to apply the coatings, coatings of this invention may be produced using other thermal spray technologies, including, but not limited to, plasma spray, high velocity oxy-fuel deposition, and hypersonic flame spray.

As many possible embodiments may be made of this invention without departing from the scope thereof, it being understood that all matter set forth is to be interpreted as illustrative and not in a limiting sense.

What is claimed:

1. A face contact fluid seal comprising a first member made from a material selected from the group consisting of a metal and silicon carbide which cooperates with and is in contact with a second member of a carbonaceous material with at least one of said members moving on the surface of the other member; and wherein at least a portion of the surface of the first member in contact with the second member is coated with a heat treated chromium carbide-age hardened nickel base alloy coating in which the chromium carbide comprises $Cr_7C_3$ plus $Cr_{23}C_6$ and wherein the chromium carbide comprises from 50 to 95 weight percent of the coating and the age hardened nickel base alloy comprises from 5 to 50 weight percent of the coating.

2. The face contact fluid seal of claim 1 wherein said second member is carbon.

3. The face contact fluid seal of claim 1 wherein the nickel base alloy, before being age hardened contains about 53 weight percent nickel, about 19 weight percent chromium, about 19 weight percent iron, about 3 weight percent molybdenum, about 5 weight percent niobium and about 1 weight percent tantalum.

4. The face contact fluid seal of claim 1 wherein the chrome carbide comprises from 70 to 90 weight percent and the age hardened nickel base alloy is from 10 to 30 weight percent of this coating.

* * * * *